(12) United States Patent
Matsuda et al.

(10) Patent No.: US 9,594,952 B2
(45) Date of Patent: Mar. 14, 2017

(54) COMPUTER-READABLE RECORDING MEDIUM, METHOD, AND APPARATUS FOR CHARACTER RECOGNITION

(71) Applicant: FUJITSU LIMITED, Kawasaki-shi, Kanagawa (JP)

(72) Inventors: Yugo Matsuda, Machida (JP); Masahiro Kataoka, Kamakura (JP); Yasuhiro Tsuyuki, Numazu (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/960,655

(22) Filed: Dec. 7, 2015

(65) Prior Publication Data
US 2016/0188970 A1    Jun. 30, 2016

(30) Foreign Application Priority Data
Dec. 26, 2014 (JP) .................................. 2014-265900

(51) Int. Cl.
G06K 9/00 (2006.01)
(52) U.S. Cl.
CPC ..... G06K 9/00422 (2013.01); G06K 9/00416 (2013.01); G06K 2209/01 (2013.01)
(58) Field of Classification Search
CPC ........ G06F 3/04883; G06K 9/00402–9/00422
See application file for complete search history.

(56) References Cited

U.S. PATENT DOCUMENTS

| | | | |
|---|---|---|---|
| 6,084,985 A | 7/2000 | Dolfing et al. | |
| 7,003,158 B1* | 2/2006 | Bennett | G06K 9/6296 382/159 |
| 2006/0062471 A1* | 3/2006 | Xu | G06K 9/00422 382/186 |
| 2010/0246964 A1* | 9/2010 | Matic | G06K 9/00422 382/185 |

(Continued)

FOREIGN PATENT DOCUMENTS

| | | |
|---|---|---|
| JP | 2000-502479 | 2/2000 |
| JP | 2000-105798 | 4/2000 |

(Continued)

*Primary Examiner* — Sean Motsinger
(74) *Attorney, Agent, or Firm* — Fujitsu Patent Center

(57) ABSTRACT

A character recognition apparatus includes a storage and a processor that executes a method including generating input stroke data from input coordinate data corresponding to an input operation, generating stroke combination candidates and evaluation data corresponding to the stroke combination candidates from the input stroke data, the stroke candidates including target verification strokes combined to constitute target verification characters, identifying a first stroke combination from the stroke combination candidates based on appearance probability of the target verification strokes, appearance probability data of each stroke stored in the storage, and the evaluation data, and outputting a character corresponding to the input operation based on the first stroke combination. The appearance probability indicates a probability in which the target verification strokes appear in each of the target verification characters. The appearance probability data is generated based on the appearance probability of the target verification strokes.

7 Claims, 13 Drawing Sheets

(56) References Cited

U.S. PATENT DOCUMENTS

| | | | | |
|---|---|---|---|---|
| 2013/0300675 A1* | 11/2013 | Tsutsui | ............... | G06F 3/04883 345/173 |
| 2014/0111416 A1* | 4/2014 | Sugiura | .............. | G06F 3/04883 345/156 |
| 2014/0119641 A1* | 5/2014 | Oda | .................. | G06K 9/00422 382/159 |
| 2014/0119659 A1* | 5/2014 | Sugiura | .............. | G06K 9/00416 382/189 |
| 2014/0184610 A1* | 7/2014 | Shibata | ............. | G06K 9/00422 345/441 |
| 2014/0210829 A1* | 7/2014 | Yokoyama | ............. | G06K 9/033 345/467 |
| 2015/0035778 A1* | 2/2015 | Hirakawa | ............. | G06F 3/0416 345/173 |
| 2015/0278216 A1* | 10/2015 | Hirabayashi | ....... | G06K 9/00416 382/189 |
| 2015/0370779 A1* | 12/2015 | Dixon | ................ | G06F 3/04883 715/261 |
| 2016/0154580 A1* | 6/2016 | Hirabayashi | ........ | G06F 3/04883 715/268 |
| 2016/0188970 A1* | 6/2016 | Matsuda | ............ | G06K 9/00422 382/187 |
| 2016/0292501 A1* | 10/2016 | Higashi | ................. | G06K 9/222 |

FOREIGN PATENT DOCUMENTS

| | | |
|---|---|---|
| JP | 2013-238917 | 11/2013 |
| WO | 98/15914 | 4/1998 |

* cited by examiner

TEXT DATA:
"CURRENTLY, 13 HOURS, 20 MINUTES, DAY 18, MONTH 7, YEAR 2014"

NUMERIC VALUE DATA:
2014, 7, 18, 13, 20

121

|   | a | b | c |
|---|---|---|---|
| 1 | /  | 1 |   |
| 2 | 2  |   |   |
| 3 | 3  |   |   |
| 4 | 4  | ) | 4 |
| 5 | 5  | ´ | 5 |
| 6 | 6  |   |   |
| 7 | ヽ | 7 | 7 |
| 8 | 8  |   |   |
| 9 | 9  |   |   |
| 0 | 0  | / |   |

120

122

| EX-AMPLE | a | b | c |
|---|---|---|---|
| 1 | 0.8 | 0.1 | 0.1(b+c) |
| 2 | 1 |   |   |
| 3 | 1 |   |   |
| 4 | 0.9(a+b) |   | 0.1 |
| 5 | 0.9(a+b) |   | 0.1 |
| 6 | 1 |   |   |
| 7 | 0.7(a+b) | 0.2 | 0.1 |
| 8 | 1 |   |   |
| 9 | 1 |   |   |
| 0 | 0.9 | 0.1(a+b) |   |

FIG.10

| PATTERN NO. | COMBINATION | NUMBER OF TIMES OF APPEARANCES |
|---|---|---|
| 1 | 2a-0a-1a-4a4b | $(1 \times 0.9 \times 0.8 \times 0.9) \times n = 0.648n$ |
| 2 | 2a-0a-1a-4c | $(1 \times 0.9 \times 0.8 \times 0.1) \times n = 0.072n$ |
| 3 | 2a-0a-1b-4a4b | $(1 \times 0.9 \times 0.1 \times 0.9) \times n = 0.081n$ |
| 4 | 2a-0a-1b-4c | $(1 \times 0.9 \times 0.1 \times 0.1) \times n = 0.009n$ |
| 5 | 2a-0a-1b1c-4a4b | $(1 \times 0.9 \times 0.1 \times 0.9) \times n = 0.081n$ |
| 6 | 2a-0a-1b1c-4c | $(1 \times 0.9 \times 0.1 \times 0.1) \times n = 0.009n$ |
| 7 | 2a-0a0b-1a-4a4b | $(1 \times 0.1 \times 0.8 \times 0.9) \times n = 0.072n$ |
| 8 | 2a-0a0b-1a-4c | $(1 \times 0.1 \times 0.8 \times 0.1) \times n = 0.008n$ |
| 9 | 2a-0a0b-1b-4a4b | $(1 \times 0.1 \times 0.1 \times 0.9) \times n = 0.009n$ |
| 10 | 2a-0a0b-1b-4c | $(1 \times 0.1 \times 0.1 \times 0.1) \times n = 0.001n$ |
| 11 | 2a-0a0b-1b1c-4a4b | $(1 \times 0.1 \times 0.1 \times 0.9) \times n = 0.009n$ |
| 12 | 2a-0a0b-1b1c-4c | $(1 \times 0.1 \times 0.1 \times 0.1) \times n = 0.001n$ |

FIG.11

| COMBINATION OF TWO CODES | | NUMBER OF TIMES OF APPEARANCES |
|---|---|---|
| FRONT | REAR | |
| 2a | 0a | $0.648n + 0.072n + \cdots + 0.009n + 0.001n$ |
| 0a | 1a | $0.648n + 0.072n$ |
| 1a | 4a | $0.648n + 0.072n$ |
| 4a | 4b | $0.648n + 0.081n + 0.081n + 0.072n + 0.009n + 0.009n$ |
| 1a | 4c | $0.072n + 0.008n$ |
| ⋮ | ⋮ | ⋮ |

| FRONT | REAR | NUMBER OF TIMES OF APPEARANCES | APPEARANCE PROBABILITY |
|---|---|---|---|
| 0a | 0a | 0.81 | 0.007274 |
| 0a | 0b | 0.09 | 0.000808 |
| 0a | 1a | 0.72 | 0.006466 |
| 0a | 1b | 0.18 | 0.001616 |
| 0a | 1c | 0 | 0 |
| ⋮ | ⋮ | ⋮ | ⋮ |
| 9a | 9a | 1 | 0.00898 |
| TOTAL VALUE | | 111.36 | 1 |

EXAMPLE: "17"

212

| CODE | EVALUATION VALUE |
|---|---|
| 1a | 95 |
| 4b | 90 |
| 7a | 70 |
| ... | ... |

212-s1, H1

| CODE | EVALUATION VALUE |
|---|---|
| 4b | 95 |
| 1a | 95 |
| 7a | 85 |
| ... | ... |

212-s2, H2

| CODE | EVALUATION VALUE |
|---|---|
| 7b | 90 |
| 1b | 50 |
| 3a | 50 |
| ... | ... |

| PATTERN |
|---|
| 1a1a1a |
| 1a1a1b |
| 1a1a1c |
| ⋮ |
| 1a7a7b |
| 7a1a3b |
| ⋮ |

| PATTERN | SCORE | |
|---|---|---|
| 1a7a7b | 84 | |
| 7a1a3a | 79 | |
| 1a1a7b | 68 | |
| 1a1a1b | 65 | |
| ⋮ | ⋮ | ⋮ |
| 1a4b7b | 0 | |

FIG.16B

SCORE OF PATTERN "1a7a7b" = $\sum (Si \times Pi)\alpha$
   = $(95 \times P1 + 85 \times P2 + 90 \times P3) \times \alpha$ $P1$ = APPEARANCE PROBABILITY OF COMBINATION OF $0^{TH}$ STROKE AND $1^{ST}$ STROKE (-, 1a)

$P2$ = APPEARANCE PROBABILITY OF COMBINATION OF $1^{ST}$ STROKE AND $2^{ND}$ STROKE (1a, 7a)

$P3$ = APPEARANCE PROBABILITY OF COMBINATION OF $2^{ND}$ STROKE AND $3^{RD}$ STROKE (7a, 7b)

FIG.17

| PATTERN | BOUNDARY | SCORE |
|---------|----------|-------|
| 1a7a7b | s1 | 84 |
| 7a1a3a | s1s2 | 79 |

| STATUS | TIME | ADDITIONAL VALUE |
|--------|------|------------------|
| BOUNDARY OF CHARACTERS | GREATER THAN OR EQUAL TO 0.5 SECONDS | +20 |
| MIDST OF INPUTTING CHARACTER | LESS THAN 0.5 SECONDS | +20 |

_230

| BETWEEN STROKES | TIME |
|---|---|
| s1→s2 | 0.9 SECONDS |
| s2→s3 | 0.2 SECONDS |

215

| PATTERN | BOUNDARY | SCORE |
|---|---|---|
| 1a7a7b | s1 | 40 (=20+20) |
| 7a1a3a | s1s2 | 20 (=20+0) |

| PATTERN | BOUNDARY | SCORE |
|---|---|---|
| 1a7a7b | s1 | 124 |
| 7a1a3a | s1s2 | 99 |

…

COMPUTER-READABLE RECORDING MEDIUM, METHOD, AND APPARATUS FOR CHARACTER RECOGNITION

CROSS-REFERENCE TO RELATED APPLICATIONS

This application is based upon and claims the benefit of priority of the prior Japanese Patent Application No. 2014-265900 filed on Dec. 26, 2014, the entire contents of which are incorporated herein by reference.

FIELD

The embodiments discussed herein are related to a computer-readable recording medium, a method, and an apparatus for character recognition.

BACKGROUND

Conventionally, there is known a character recognition technology for recognizing characters that are input by hand. For example, one known character recognition technology recognizes characters by strokes (handwriting) that are input into a frame. Another known character recognition technology recognizes characters by converting input strokes into position information and relying on the converted position information and position information of a letter shape.

RELATED ART DOCUMENT

Patent Document 1: Japanese Laid-Open Patent Publication No. 2000-105798
Patent Document 2: Japanese Laid-Open Patent Publication No. 2013-238917

However, with the conventional character recognition technology, such as recognizing characters from strokes that are input into a frame, a character may be erroneously recognized due to inability to distinguish strokes that were input before or afterwards. In the case of recognizing characters by relying on position information of strokes and letter shapes, characters may be erroneously recognized (particularly, in a case of recognizing characters such as numbers that are input with a few strokes) due to the difficulty of accurately determining boundaries between the characters.

That is, with the conventional character recognition technology in which characters are estimated by respective strokes, characters cannot be accurately recognized merely by information obtained from input strokes in a case of recognizing characters that are input with a few strokes and have simple character shapes.

SUMMARY

According to an aspect of the invention, there is provided a non-transitory computer-readable recording medium storing therein a character recognition program that causes a computer to execute a process. The process includes generating input stroke data from input coordinate data corresponding to an input operation, generating a plurality of stroke combination candidates and evaluation data corresponding to the plurality of stroke combination candidates from the input stroke data, the plurality of stroke candidates including target verification strokes that are combined to constitute one or more target verification characters, identifying a first stroke combination from the plurality of stroke combination candidates based on appearance probability of the target verification strokes, appearance probability data of each stroke stored in a storage device, and the evaluation data, and outputting a character corresponding to the input operation based on the first stroke combination. The appearance probability of the target verification strokes indicates a probability in which the target verification strokes appear in each of the one or more target verification characters. The appearance probability data is generated based on the appearance probability of the target verification strokes.

The object and advantages of the invention will be realized and attained by means of the elements and combinations particularly pointed out in the claims.

It is to be understood that both the foregoing general description and the followed detailed description are exemplary and explanatory and are not restrictive of the invention, as claimed.

BRIEF DESCRIPTION OF DRAWINGS

FIG. 10 is a schematic diagram illustrating a stroke database according to an embodiment of the present invention;

FIG. 11 is a schematic diagram for describing an operation of an appearance probability calculation part according to an embodiment of the present invention;

FIG. 15 is a schematic diagram illustrating patterns of combinations of strokes generated by a pattern generation part according to an embodiment of the present invention;

FIGS. 16A and 16B are schematic diagrams for describing a statistic verification result table according to an embodiment of the present invention;

FIG. 17 is a schematic diagram illustrating a segment position table according to a second embodiment of the present invention;

FIG. 18 is a schematic diagram illustrating a stroke time table according to an embodiment of the present invention;

DESCRIPTION OF EMBODIMENTS

Figure 1:
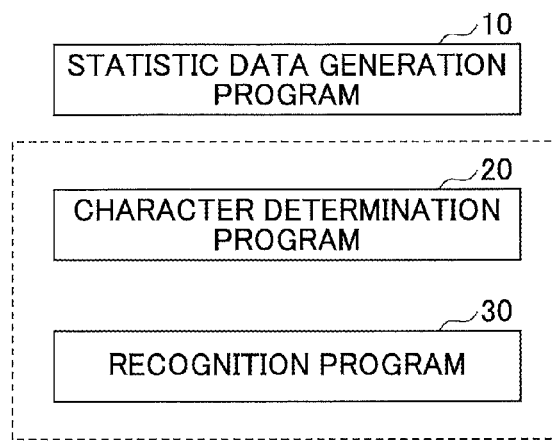
FIG. 1 is a schematic diagram illustrating a program configuration according to an embodiment of the present invention.

Next, embodiments of the present invention are described with reference to the accompanying drawings. FIG. 1 is a schematic drawing illustrating a program configuration according to an embodiment of the present invention.

A statistic data generation program 10, a character determination program 20, and a recognition program 30 are programs that are mainly used in this embodiment.

The statistic data program 10 extracts numerals from a large amount of document data (e.g., so-called "big data") and generates statistic data that indicate the appearance probability of each combination of strokes included in the extracted numerals. It is to be noted that the term "stroke(s)" refers to handwriting. For example, one stroke corresponds to a start point to an end point of one's handwriting.

The character determination program 20 refers to the generated statistic data and determines the boundary between characters based on the combination of strokes that are input. That is, among the strokes that are input, the character determination program 20 determines which of the strokes constitutes a single character.

The recognition program 30 recognizes a character indicated by the stroke(s) that is determined to constitute a single character.

The statistic data generation program 10, the character determination program 20, and the recognition program 30 of this embodiment may be collectively installed in a single apparatus or separately installed corresponding apparatuses. Alternatively, the character determination program 20 and the recognition program 30 may be installed as a character recognition program in a single apparatus.

In the following embodiment, the statistic data generation program 10, the character determination program 20, and the recognition program 30 are installed in a single apparatus. In the following embodiment, the apparatus having the statistic data generation program 10, the character determination program 20, and the recognition program 30 installed therein is referred to as a "character recognition apparatus".

Figure 2:
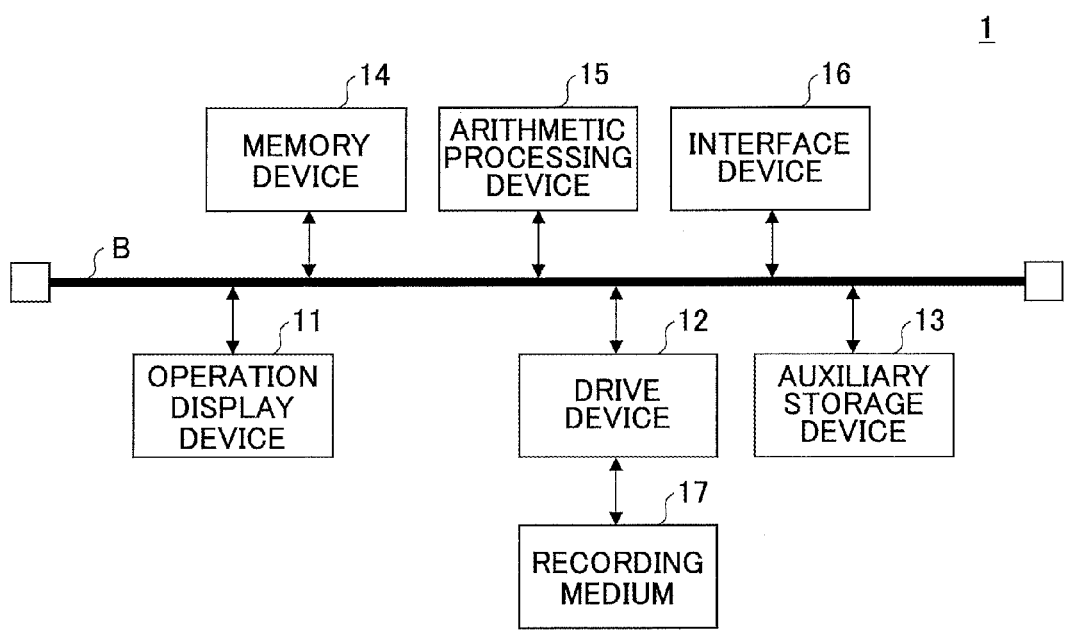
FIG. 2 is a schematic diagram illustrating a hardware configuration of a character recognition apparatus according to an embodiment of the present invention.

FIG. 2 is a schematic diagram illustrating a hardware configuration of a character recognition apparatus 1 according to an embodiment of the present invention. The character recognition apparatus 1 of this embodiment includes an operation display device 11, a drive device 12, an auxiliary storage device 13, a memory device 14, an arithmetic processing device (processor) 15, and an interface device 16 that are connected to each other by a bus B.

The operation display device 11 is, for example, a touch panel that is used to input various signals and display (output) various signals. The interface device 16 includes, for example, a modem or a LAN (Local Area Network) card that is used for connecting to a network.

The statistic data generation program 10, the character determination program 20, and the recognition program 30 are a part of various programs that control the character recognition apparatus 1. Each of the statistic data generation program 10, the character determination program 20, and the recognition program 30 may be provided by way of distribution of a recording medium 17 or downloading from a network. The recording medium 17 having the statistic data generation program 10, the character determination program 20, and the recognition program 30 recorded thereto includes various types of recording media. For example, the recording medium 17 may be a recording medium that optically, electrically, or magnetically records information such as a CD-ROM, a flexible disk or a magneto optical disk. The recording medium 17 may also be a recording medium that electrically records information such as a ROM or a flash memory.

Further, when the recording medium 17 having the statistic data generation program 10, the character determination program 20, and the recognition program 30 recorded thereto is mounted to the drive device 12, each program recorded in the recording medium 17 is installed into the auxiliary storage device 13 via the drive device 12. Alternatively, each program downloaded from a network is installed into the auxiliary recording device 13 via the interface device 16.

In addition to storing the installed statistic data generation program 10, the character determination program 20, and the recognition program 30, the auxiliary storage device 13 also stores, for example, necessary files and data. The memory device 14 reads out the statistic data generation program 10, the character determination program 20, and the recognition program 30 from the auxiliary storage device 13 when a computer is activated and stores the read out programs therein. Then, the arithmetic processing device 15 implements the below-described various processes according to each program stored in the memory device 14.

Figure 3:
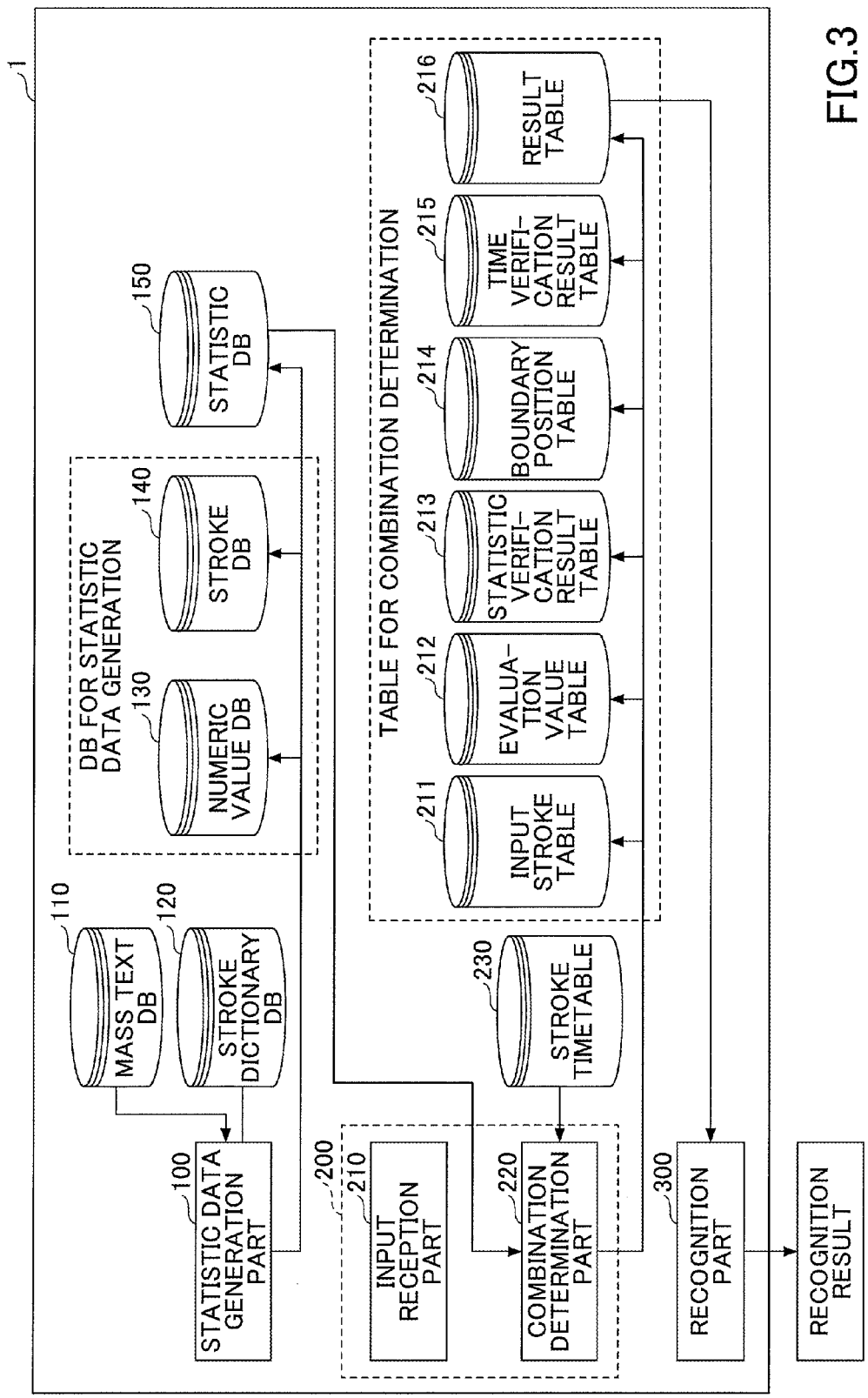
FIG. 3 is a schematic diagram illustrating functions (function parts) of a character recognition apparatus according to an embodiment of the present invention.

FIG. 3 is a schematic diagram illustrating functions (function parts) of the character recognition apparatus 1. The character recognition apparatus 1 of this embodiment includes a statistic data generation part 100, a character determination part 200, and a recognition part 300.

The statistic data generation part 100 of this embodiment is implemented by executing the statistic data generation program 10 with the arithmetic processing device 15. The character determination part 200 of this embodiment is implemented by executing the character determination program 20 with the arithmetic processing device 15. The recognition part 300 of this embodiment is implemented by executing the recognition program 30 with the arithmetic processing device 15.

The character recognition apparatus 1 of this embodiment is described as an apparatus that mainly receives input of numerals and recognizes the numerals.

In this embodiment, a mass text database 110, a stroke dictionary database 120, and a stroke timetable are included beforehand in the statistic data generation part 100.

The mass text database 110 is stored with mass text data such as big data. The stroke dictionary database 120 is stored with stroke data indicating types of strokes and usage rate data indicating the usage rate of each stroke. The stroke timetable 230 is stored with a threshold value(s) of the time for inputting a stroke(s).

The statistic data generation part 100 extracts numeric data (data indicated by numbers) from the mass text database 110 and stores the numeric data in the numeric value database 130. Then, the statistic data generation part 100 calculates the number of times in which each combination of strokes included in the numeric characters of the numeric data appears by referring to the stroke dictionary database 120 and stores the calculated number of appearances in the stroke database 140. Then, the statistic data generation part 100 generates an N-gram of statistic data in correspondence with each combination of strokes, calculates the appearance probability of each combination of strokes by referring to the stroke database 140, and stores the calculated appearance probability in the statistic database 150.

The character determination part 200 of this embodiment includes an input reception part 210 and a combination determination part 220. When the input reception part 210 of the character determination part 200 receives a character input to the character recognition apparatus 1, a coordinate value of a stroke of the input character is stored into an input stroke table 211. Then, the combination determination part 220 of the character determination part 200 determines an evaluation value that indicates the degree in which each input stroke matches the stroke information stored in the stroke dictionary database 120. Then, the combination determination part 220 stores the evaluation value in an evaluation value table 212.

Then, the combination determination part 220 determines a pattern of a combination of strokes obtained from the number of strokes input to the character recognition apparatus 1. Then, the combination determination part 220 calculates a score of each pattern by using the appearance probability of each combination of strokes stored in the statistic database 150 and the evaluation value stored in the evaluation value table 212. Then, the combination determination part 220 generates a statistic verification result table 213 including the calculated score of each pattern.

Then, the combination determination part 220 refers to the statistic verification result table 213 and determines a position that could be a boundary of a character (boundary between characters) according to predetermined number of patterns having high scores. Then, the combination determination part 220 generates a boundary position table 214 including the determined boundary position. Then, the combination determination part 220 verifies the time elapsed for inputting a stroke(s) with the data of the stroke time table 230 and generates a time verification result table 215.

Then, the combination determination part 220 refers to the boundary position table 214 and the time verification result table 215 and generates a result table 216 indicating the position of a boundary of a character constituted by the multiple strokes input into the character determination part 200.

The statistic data generation part 100 and the character determination part 200 of this embodiment are described in detail below.

When the result table 216 is generated, the recognition part 300 performs a character recognition process based on the boundary of the character indicated in the result table 216 and outputs a character recognized as a result of the character recognition process.

With the above-described embodiment, a score that is based on the evaluation value (that is obtained from input strokes and stroke data) and the appearance probability of the combination of strokes are calculated with respect to each pattern of combinations of strokes obtained from the number of input strokes. Further, with the above-described embodiment, character recognition is performed by obtaining a border (boundary) of a character according to the pattern of the combination of strokes having high scores. Accordingly, a character having a few number of strokes (e.g., a numeric character written in a few strokes) can be recognized more accurately. Further, character recognition based on strokes having a probability of constituting multiple characters can be performed more accurately.

Figure 4:
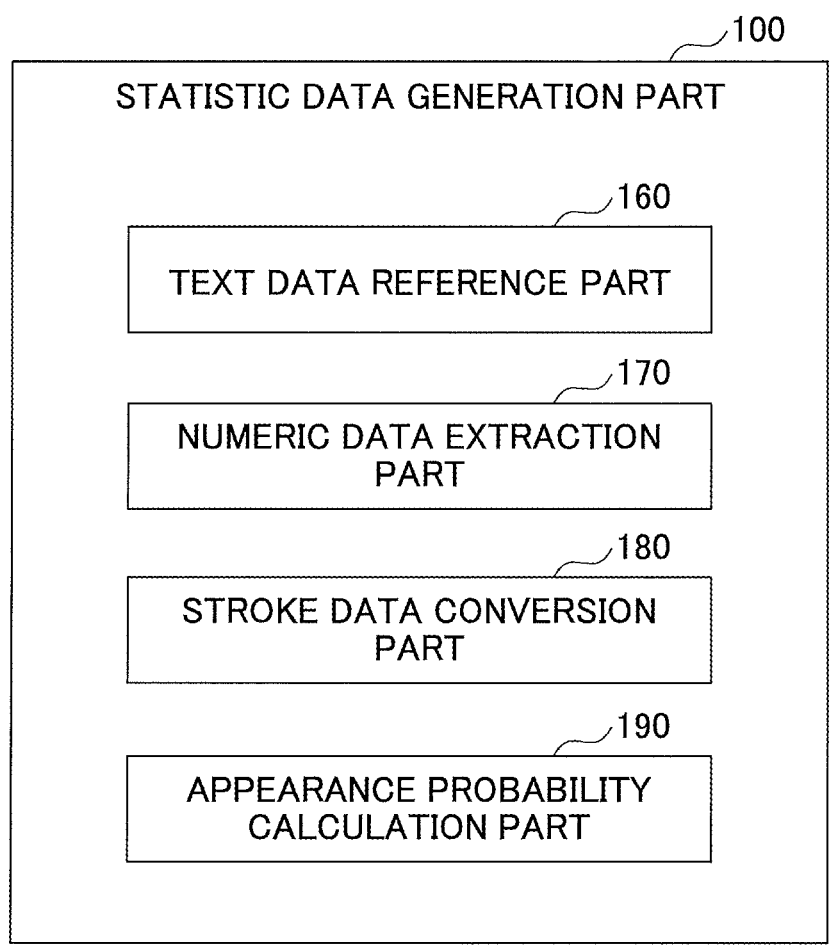
FIG. 4 is a schematic diagram illustrating a functional configuration of a statistic data generation part according to an embodiment of the present invention.

Next, the statistic data generation part 100 according to an embodiment of the present invention is described with reference to FIG. 4. FIG. 4 is a schematic diagram illustrating a functional configuration of the statistic data generation part 100 according to an embodiment of the present invention.

The statistic data generation part 100 of this embodiment includes a text data reference part 160, a numeric data extraction part 170, a stroke information conversion part 180, and an appearance probability calculation part 190.

The text data reference part 160 of this embodiment refers to a mass text database 110. For example, the mass text database 110 may be provided inside the character recognition apparatus 1 or a network outside the character recognition apparatus 1. For example, mass text data (e.g., big data) is stored in the mass text database 110. The term "big data" refers to an enormous agglomerate of complex data sets.

The numeric data extraction part 170 extracts numeric data indicating a numeral from the mass text database 110. That is, the numeric data extraction part 170 extracts text data of a numeral from the mass text database 110.

The stroke information conversion part 180 refers to the stroke dictionary database 120 and obtains combinations of strokes included in the numeral of the extracted numeric data and the number of times of appearances of each of the combinations. Then, the stroke information conversion part 180 stores the obtained combination of strokes and the number of times of appearances in the stroke database 140. The stroke dictionary database 120 and the stroke database 140 are described in detail below.

The appearance probability calculation part 190 collects N-gram statistic data from the combination of strokes included in a numeral, calculates the appearance probability of each combination constituted by N strokes, and stores the calculation results in the statistic database 150.

The processes performed by each part of the statistic data generation are described in detail below.

Figure 5:
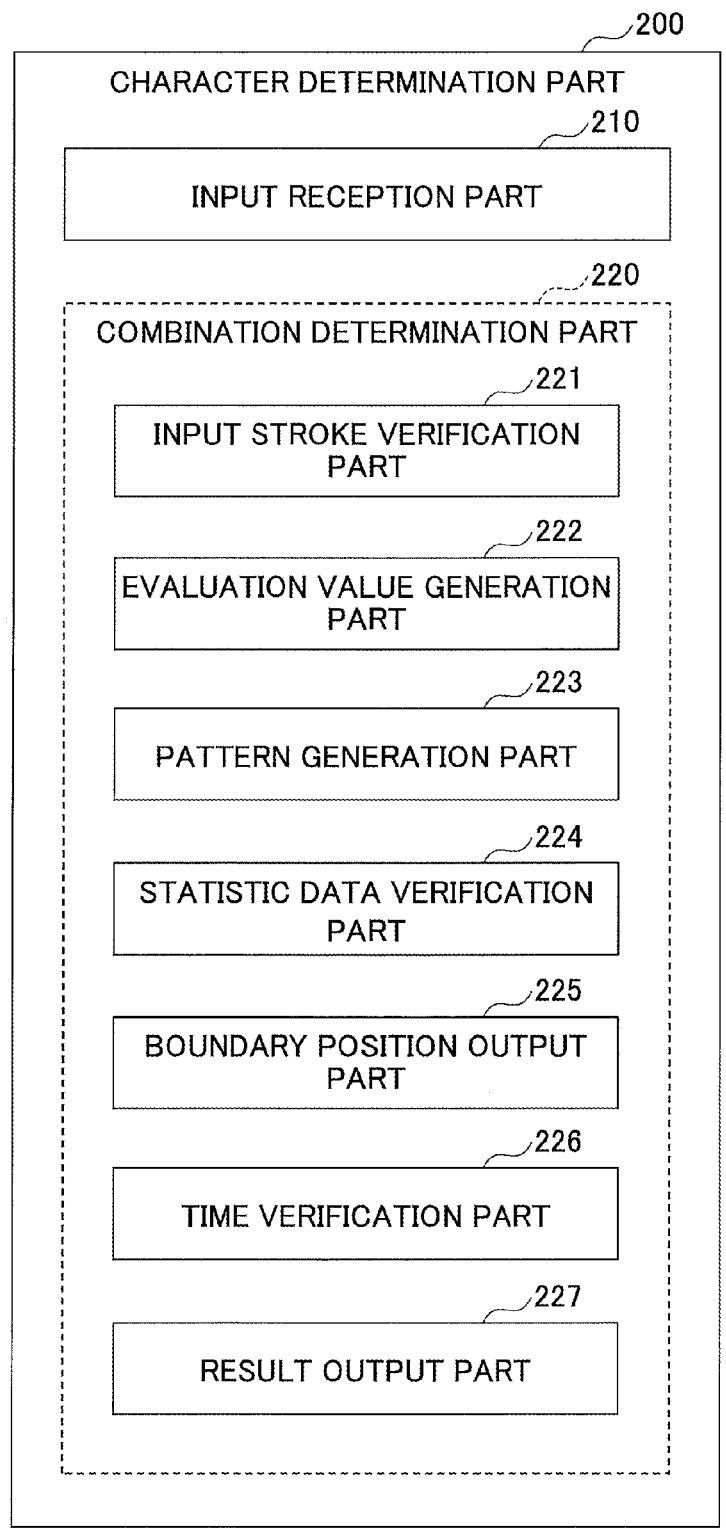
FIG. 5 is a schematic diagram illustrating a functional configuration of a character determination part according to an embodiment of the present invention.

FIG. 5 is a schematic diagram illustrating a functional configuration of the character determination part 200 according to an embodiment of the present invention. The character determination part 200 of this embodiment includes an input reception part 210 and a combination determination part 220.

The input reception part 210 receives a stroke input to the character recognition apparatus 1. The combination determination part 220 includes an input stroke verification part 221, an evaluation value generation part 222, a pattern generation part 223, a statistic data verification part 224, and a boundary position output part 225, a time verification part 226, and a result output part 227.

The input stroke verification part 221 generates an input stroke table 211 into which input strokes are stored as coordinate values. Further, the input stroke verification part 221 obtains stroke time information when strokes are input to the character recognition apparatus 1 and stores the stroke time information in the input stroke table 221. The stroke time information of this embodiment corresponds to a discontinuation period from a time when an end point of an input stroke is detected to a time when a start point of a next input stroke is detected.

Then, the input stroke verification part 221 verifies input strokes with stroke information stored in the stroke dictionary database 120.

The evaluation value generation part 222 generates an evaluation value of each input stroke according to the results of the verification by the input stroke verification part 221. In this embodiment, the evaluation value of a stroke is a value indicating the degree in which an input stroke matches the stroke information stored in the stroke dictionary database 120 (first evaluation value).

The pattern generation part 223 generates one or more patterns of combinations of strokes that can be anticipated from the number of input strokes (combination candidate). The statistic data verification part 224 verifies each generated pattern with the data stored in the statistic database 150, calculates a score based on the evaluation value of the stroke(s) included in a pattern and the appearance probability of the pattern (second evaluation value), and stores the calculated score in the statistic verification result table 213.

The boundary position output part 225 outputs the boundary position table 214 indicating the position of the character in each pattern by referring to the statistic verification result table 213.

The time verification part 226 verifies the stroke time information obtained by each input stroke with the information stored in the stroke time table 230 and generates the time verification result table 215 having its scores changed according to the result of verification of the stroke time information. The result output part 227 outputs the result table that stores the position of the boundary of the character of each input stroke based on the time verification result table 215.

The processes performed by each part of the character determination part 200 are described in detail below.

Figure 6:
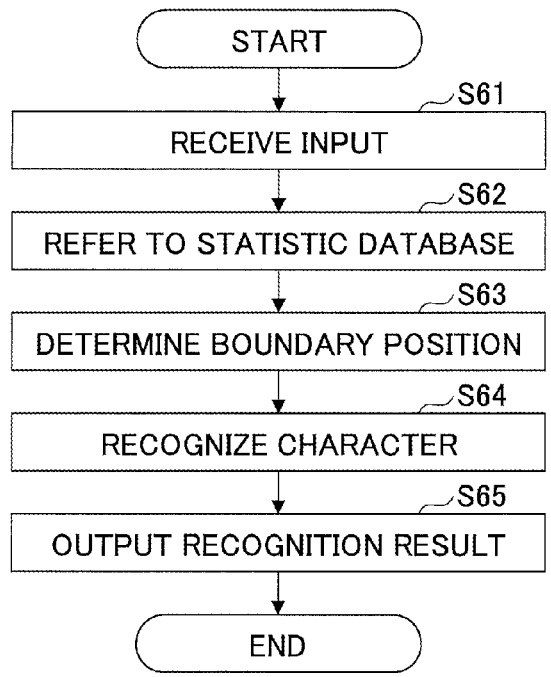
FIG. 6 is a flowchart illustrating an operation of a character recognition apparatus according to an embodiment of the present invention.

Next, an operation of the character recognition apparatus 1 according to an embodiment of the present invention is described. FIG. 6 is a flowchart illustrating an operation of the character recognition apparatus 1 according to an embodiment of the present invention.

The character recognition apparatus 1 of this embodiment receives one or more strokes that are input to the character recognition apparatus 1 by way of the input reception part 210 of the character determination part 200 (Step S61). Then, the character recognition apparatus 1 refers to the statistic database 150 (Step S62) and determines a position of a boundary of a character of the input strokes by way of the combination determination part 220 (Step S63). That is, the character recognition apparatus 1 determines a combination of strokes constituting a single character according to the strokes input to the character recognition apparatus 1.

Then, the character recognition apparatus 1 performs character recognition based on the combination of strokes constituting a single character (Step S64) and outputs a character as a result of the character recognition by way of the recognition part (Step S65).

It is to be noted that the process of generating the statistic database 150 by the statistic data generation part 100 is not included in the flowchart illustrated in FIG. 6 because the statistic database 150 is assumed to be already generated at the time of receiving the input of a stroke. However, the process of generating the statistic database 150 may be included. That is, the character recognition apparatus 1 may generated the statistic database 150 by way of the statistic data generation part 100 when the stroke is input to the character recognition apparatus 1.

Next, the process of generating the statistic database 150 by the statistic data generation part 100 according to an embodiment of the present invention is described.

Figure 7:
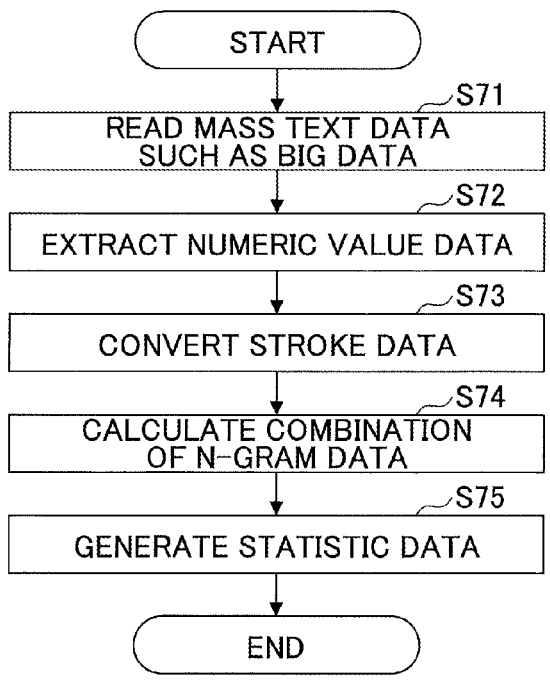
FIG. 7 is a flowchart illustrating an operation of a statistic data generation part according to an embodiment of the present invention.

FIG. 7 is a flowchart illustrating the process of the statistic data generation part 100 according to an embodiment of the present invention. The statistic data generation part 100 of this embodiment reads text data stored in the mass text database 110 by way of a text data reference part 160 (Step S71). Then, the statistic data generation part 100 extracts numeric data from the text data read from the mass text database 110 (Step S71) and stores the extracted numeric data in the numeric value database 130 by way of the numeric data extraction part 170 (Step S72).

Then, the statistic data generation part 100 calculates one or more combination of strokes constituting a numeral included in the extracted numeric data and the number of appearances of each combination and stores the calculated combination and number of appearances in the stroke database 140 by way of the stroke data conversion part 180 (Step S73).

Then, the statistic data generation part 100 calculates an N-gram combination based on the strokes constituting the numeral included in the numeric data (Step S74) and generates statistic data calculated the appearance probability of each N-gram combination by way of the appearance probability calculation part 190 (Step S75).

Next, each step performed in the above-described process of the statistic data generation part 100 is described.

Figures 8, 9:
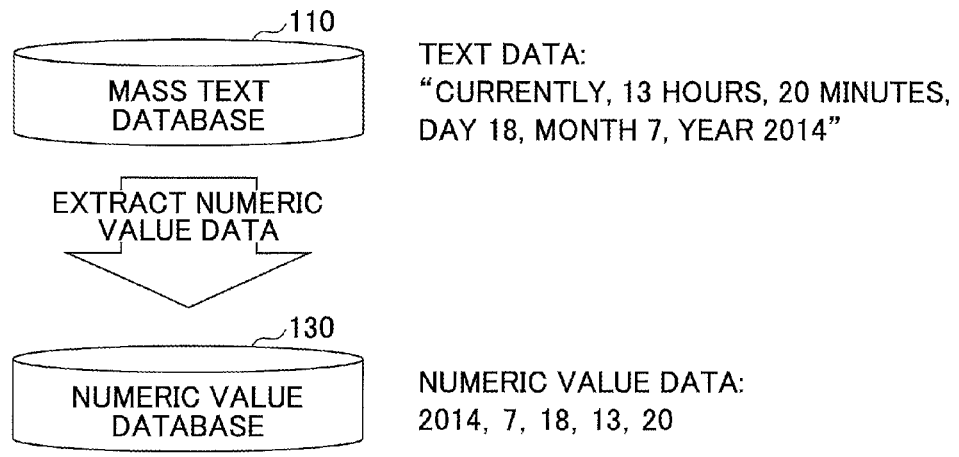
FIG. 8 is a schematic diagram illustrating an operation of a numeric data extraction part according to an embodiment of the present invention.
FIG. 9 is a schematic diagram illustrating an example of a stroke dictionary database according to an embodiment of the present invention.

FIG. 8 is a schematic diagram illustrating a process of the numeric data extraction part 170 according to an embodiment of the present invention. For example, in a case where text data such as "Currently, 13 hours, 20 minutes, day 18, month 7, year 2014" is stored in the mass text database 110, the numeric data extraction part 170 of this embodiment extracts the numeric data "2014", "7", "18", "13", and "20" included in the text data.

Next, the process of the stroke data conversion part 180 according to an embodiment of the present invention is described with reference to FIGS. 9 and 10. FIG. 9 is schematic diagram illustrating the stroke dictionary database 120 according to an embodiment of the present invention. The stroke dictionary database 120 of this embodiment includes stroke data 121 and usage rate data 122.

The stroke data 121 and the usage rate data 122 of this embodiment are various pre-existing data obtained by statistics. The stroke data 121 and the usage rate data 122 are stored beforehand in the character recognition apparatus 1.

The stroke data 121 of this embodiment includes numbers and target verification strokes that are associated to each other by the numbers 0 to 9. The target verification strokes of this embodiment refers to strokes that are verified with strokes input to the character recognition apparatus 1. Further, the numbers 0 to 9 are target verification characters that are verified with combinations of strokes input to the character recognition apparatus 1. The target verification strokes of this embodiment are strokes that constitute the target verification strokes.

In the stroke data 121 illustrated in FIG. 9, the target verification strokes are arranged in rows, and symbols a to c are assigned to each of the target verification strokes obtained from the target verification characters. Thus, in this embodiment, the target verification strokes are identified according to the target verification characters and the symbols assigned to the target verification strokes.

For example, a single stroke among the multiple strokes obtained from the number "1" is identified from the number "1" and the symbol "b". Further, another single stroke among the multiple strokes obtained from the number "1" is identified from the number "1" and the symbol "a".

In this embodiment, a combination of a target verification character and a symbol indicating the type of target verification stroke is hereinafter referred to as a code that identifies a target verification stroke. For example, a code of a target verification stroke identified by the combination of the number "1" and the symbol "a" is referred to as "code 1a". Similarly, a code of a target verification stroke identified by the combination of the number "4" and the symbol "b" is referred to as "code 4b".

The usage rate data 122 of this embodiment indicates the usage rate of each target verification stroke. In other words, the usage rate of each target verification stroke is indicates the probability in which the target verification stroke appears in the numeric value database 130.

For example, in the usage rate data 122 of this embodiment, the rate in which the target verification stroke corresponding to the code 1a is used indicates a usage rate of "0.8" when the number "1" is written (input) whereas the rate in which the target verification stroke corresponding to the code 1b indicates a usage rate of "0.1" when the number "1" is written (input).

Likewise, the rates in which the target verification stroke corresponding to the codes 1b and 1c indicate usage rates of "0.1" when the number "1" is written (input). According to this embodiment, in a case of indicating the usage rate of a target verification stroke that does not independently constitute a target verification character (non-independent target verification stroke), a symbol assigned to another target verification stroke to be combined with the non-independent target verification stroke is used, so that target verification strokes to be combined are identified.

For example, in a case where the target verification character is the number "1", the target verification stroke of code 1c does not independently constitute the target verification character "1" but instead constitutes the target verification character "1" by being combined with the target verification stroke of code 1b. Therefore, the usage rate of code 1c is indicated as "0.1 (b+c)" in FIG. 9.

Similarly, in a case of writing the number "4" (target verification character "4"), the rate in which the target verification strokes of codes "4a" and "4b" are used is indicated with a usage rate of "0.9 (a+b)" in FIG. 9. Further, in the case of writing the number "4", rate in which the target verification stroke of code "4c" is used is indicate with a usage rate of "0.2".

The stroke data conversion part 180 of this embodiment refers to the stroke data 121 and the usage rate data 122 and calculates the number of appearances of each combination of target verification strokes constituting a number included in the numeric data extracted by the numeric data extraction part 170.

FIG. 10 is a schematic diagram illustrating the stroke database 140 according to an embodiment of the present invention. The stroke database 140 of this embodiment includes one or more patterns that includes a combination of target verification strokes constituting a number extracted by the numeric data extraction part 170. Each of the patterns is associated with the number of appearances of each combination.

For example, in a case where the extracted numeric data is "2014", the patterns of the combinations of target verification strokes that constitute "2014" are associated with the number of appearances of each combination as illustrated in FIG. 10.

First, the stroke data conversion part 180 obtains all of the combinations of the target verification strokes constituting "2014".

The target verification stroke that constitutes the number "2" included in "2014" is only the target verification stroke of code "2a".

There are two patterns for the number "0", one being a case where the number "0" is constituted only by the target verification stroke of code "0a" and the other being a case where the number "0" is constituted by a combination of the target verification stroke of code "0a" and the target verification stroke of code "0b".

There are three patterns for the number "1", one being a case where the number "1" is constituted only by the target verification stroke of code "1a", another being a case where the number "1" is constituted only by the target verification stroke of code "1b", and yet another being a case where the number "1" is constituted by a combination of the target verification stroke of code "1b" and the target verification stroke of code "1c".

There are two patterns for the number "4", one being a case where the number "4" is constituted by a combination of the target verification stroke of code "4a" and the target verification stroke of code "4b" and another being a case where the number "4" is constituted only by the target verification stroke of code "4c".

Accordingly, the number of patterns of the combinations of the target verification strokes constituting "2014" is 12 patterns denoted by pattern numbers 1 to 12 as illustrated in FIG. 10.

The stroke data conversion part 180 of this embodiment obtains the number of appearances of each combination of the target verification strokes that constitute "2014" based on the number of times in which the numeric value "2014" appears in the mass text database 110 and the usage rate data of the stroke dictionary database 120.

The embodiment of FIG. 10 illustrates the number of appearances of each combination of the target verification strokes in a case where the numeric value "2014" appears n times in the mass text database 110.

Next, the number of appearances of the pattern number "1" is described. In the pattern number "1", the numeric value "2014" is constituted by code "2a", code "1a", code "4a", and code "4b".

Among the usage rate data 122, the usage rate data of the code "2a" is "1" and the usage rate data of the code "0a" is "0.9". Further, the usage rate data of the code "1a" is "0.8", and the usage rate data of the combination of codes "4a" and "4b" is "0.9".

The stroke data conversion part 180 of this embodiment multiplies the usage rate data of each code with the number of appearances of the numeric value "2014" and assumes that the multiplication result is the number of appearances of the combinations of pattern number "1". Accordingly, the number of appearances of the combinations of the pattern number "1" is "0.648n" (=1×0.9×0.8×0.9)×n. The number of appearances indicates the number of times in which the numeric value "2014" is formed by the combinations of target verification strokes of the pattern number "1". That is, the number of appearances indicates the frequency in which the combinations of the target verification strokes of the pattern number "1" appear in the case of forming the numeric value "2014".

The stroke data conversion part 180 of this embodiment obtains the number of appearances of each combination from pattern "1" to pattern "12" as illustrated in FIG. 10.

The stroke data conversion part 180 of this embodiment performs the above-described process on every numeric value extracted from the numeric value extraction part 170 to obtain the patterns of the combinations of target verification strokes and the number of appearances of each combination and stores the obtained patterns and number of appearances in the stroke database 140.

The appearance probability calculation part 190 of this embodiment calculates the appearance probability based on an N-gram model. The appearance probability indicates the degree in which the combination of "N" number of codes appears among all of the combinations of the target verification strokes stored in the stroke database 140.

FIG. 11 illustrates an example of assuming that "N"=2, obtaining combinations of two codes from the combinations of pattern number "1" of FIG. 10, and calculating the number of appearances of each combination constituted by two codes. The process of calculating the number of appearances of each combination constituted by two codes may be performed as a part of the process of calculating the appearance probability.

The combination of the target verification strokes of the pattern number "1" is "2a-0a-1a-4a4b". Accordingly, the appearance probability calculation part 190 obtains combinations constituted by two codes "2a-0a", "0a-1a", "1a-4a", and "4a-4b" from the combinations of the pattern number "1".

Next, a process of calculating the appearance number of the combination "2a-0a" of the stroke database 140 is described.

The appearance probability calculation part 190 of this embodiment determines the number of appearances of a combination "2a-0a" by extracting a pattern including the combination "2a-0a" from the patterns of combinations of all target verification strokes stored in the stroke database 140 and calculating a total value of the number of appearances corresponding to the extracted pattern.

For example, in the stroke database 140 illustrated in FIG. 10, the combination "2a-0a" is included in all of patterns of pattern numbers 1 to 12. Therefore, the number of appearances of the combination "2a-0a" corresponds to the total of the number of appearances of each of the patterns of pattern numbers 1 to 12.

Further, in the stroke database 140, the combination "0a-1a" is included only in the patterns of pattern numbers 1 and 2. Therefore, the number of appearances of the combination "0a-1a" corresponds to the total of the number of appearances of the pattern of pattern number 1 and the number appearances of the pattern of pattern number 2.

The appearance probability calculation part 190 of this embodiment performs the above-described process on the patterns of combinations of all target verification strokes included in the stroke database 140. Then, the results of the above-described process are sorted starting from the combination "0a-0a" and stored in the statistic database 150 in the sorted state.

Figures 12, 13:
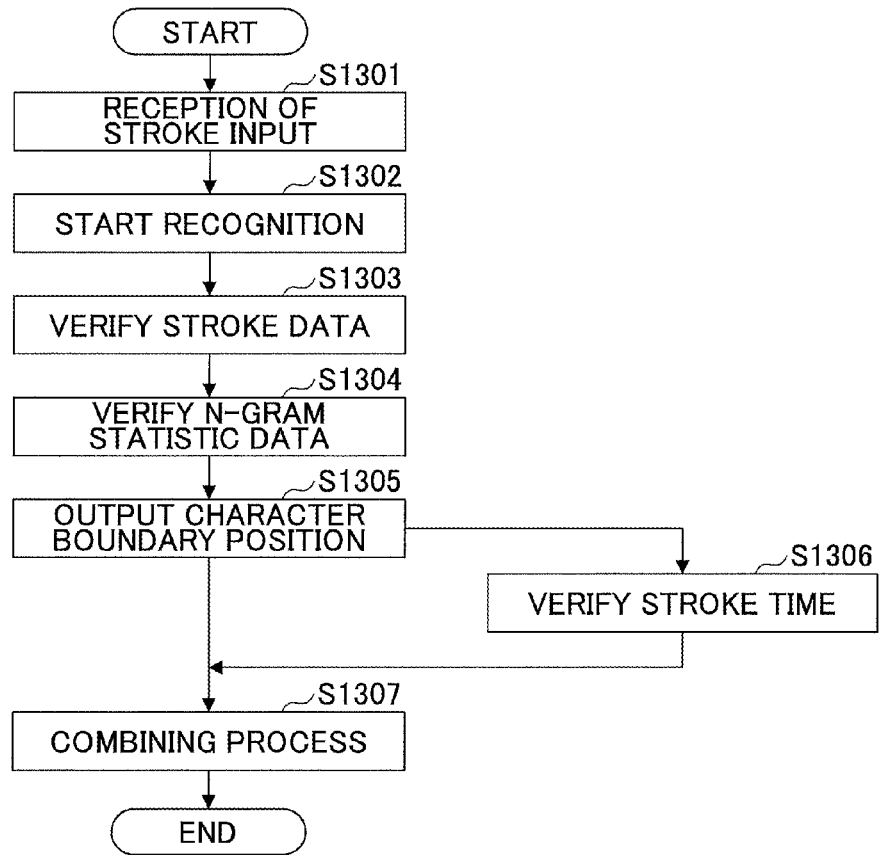
FIG. 12 is a schematic diagram illustrating a statistic database according to an embodiment of the present invention.
FIG. 13 is a flowchart illustrating an operation of a character determination part according to an embodiment of the present invention.

FIG. 12 illustrates the statistic database 150 according to an embodiment of the present invention. The statistic database 150 of this embodiment stores combinations of two codes, the number of appearances of each combination, and the appearance probability therein. Although the combinations of two codes are stored in the statistic database 150 in a sorted state starting from the combination "0a-0a", the statistic database 150 may store the combination of two codes in a different manner.

The appearance probability of this embodiment corresponds to a value obtained by dividing the number of appearances of each combination of two codes with the total value of the number of appearances of all of the combinations. Therefore, in the example of FIG. 12, the appearance probability of the combination "0a-0b" corresponds to the number of appearances "0.81" of the combination "0a-0b" divided by the total value "111.36" of the number of appearances of each combination.

According to this embodiment, the statistic database 150 is generated by performing the above-described processes. Although the statistic data generation part 100 and the statistic database 150 are included in the character recognition apparatus 1 of this embodiment, the statistic data generation part 100 and the statistic database 150 need not necessarily be included in the character recognition apparatus 1. For example, the statistic data generation part 100 and the statistic database 150 may be provided in an external apparatus that can communicate with the character recognition apparatus 1. Alternatively, only the statistic database 150 may be provided in the external apparatus.

Next, a character determination part 200 according to another embodiment of the present invention is described. FIG. 13 illustrates a flowchart illustrating the process of the character determination part according to another embodiment of the present invention.

The character determination part 200 of this embodiment receives a stroke input to the character determination part 200 by way of the input reception part 210 (Step S1301).

Then, the character determination part 200 begins recognition of one or more strokes by way of the input stroke verification part 221 of the combination determination part 220 (Step S1302).

More specifically, when a stroke is received, the input stroke verification part 221 obtains stroke time data including an input time (i.e. the time that begins when a start point of the stroke is input and ends when an endpoint of the stroke is input) and a discontinuation time (i.e. the time that begins when the end point of the stroke is input and ends when a start point of a subsequent stroke is input) and stores the stroke time data in the input stroke table 211. Further, the input stroke verification part 221 stores the input stroke in the form of coordinate values in the input stroke table 211.

Then, the combination determination part 220 verifies the input stroke with the data stored in the stroke dictionary database 120 by way of the input stroke verification part 221, and generates an evaluation value (i.e. a value indicating the degree in which the input stroke matches the data stored in the stroke dictionary database 120) of each stroke by way of the evaluation value generation part 222 (Step S1303).

Then, the combination determination part 220 refers to the stroke dictionary database 120 and generates a pattern of combinations of codes of the target verification strokes that can be anticipated by the number of input strokes by way of the pattern generation part 223. Then, the combination determination part 220 refers to the statistic database 150, calculates a score based on an evaluation level of a stroke included in the generated pattern and the appearance probability of the combination of the two codes included in the generated pattern, and stores the results of the calculation in the statistic verification result table 213 by way of the statistic data verification part 224 (Step S1304).

Then, the combination determination part 220 refers to the statistic verification result table 213, determines the position of the boundary of the character constituting each pattern, and stores the determined position in the boundary position table 214 by way of the boundary position output part 225 (Step S1305).

Then, the combination determination part 220 verifies the stroke time data with the data stored in the stroke time table 230 and stores a score resulting from the verification in the time verification result table 215 by way of the time verification part 226 (Step S1306).

Then, the combination determination part 220 refers to the boundary position table 214 and the time verification result table 215, outputs the position of the boundary of the character constituted by the input stroke, and stores the output in the result table 216 by way of the result output park (Step S1307).

The character determination part 200 of this embodiment outputs the position of the boundary of a character to the recognition part 300. The recognition part 300 can distinguish the input strokes included in a single character based on the position of the boundary of a character provided by the character determination part 200. Accordingly, the recognition part 300 can recognize characters by using a character recognition process of a related art.

Figures 14A, 14B:
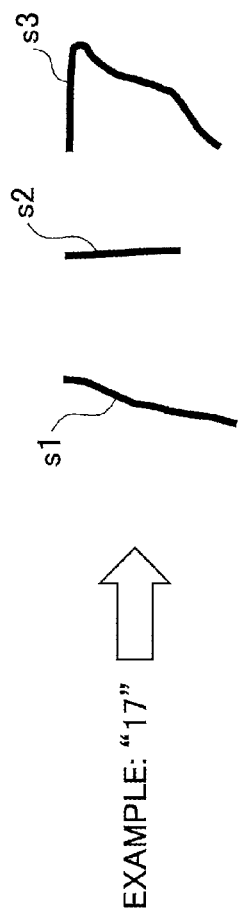
FIGS. 14A and 14B are schematic diagrams for describing an evaluation value table.

Next, each step of the process of the combination determination part 220 is described in further detail. FIGS. 14A and 14B are schematic diagrams for describing an evaluation value table according to an embodiment of the present invention. FIG. 14A illustrates an example of input strokes. FIG. 14B illustrates an example of an evaluation value table for each input stroke.

In the following example, a numeric value "17" is assumed to be written (input) in three strokes s1, s2, and s3 as illustrated in FIG. 14A.

The input stroke verification part 221 of this embodiment verifies a coordinate value of each stroke stored in the input stroke table 211 with the stroke data 121 stored in the stroke dictionary database 120. Then, the evaluation value generation part 222 generates an evaluation value table of each stroke. FIG. 14B illustrates an evaluation value table 212-$s1$ indicating a result of verifying the stroke s1 with the stroke data, an evaluation value table 212-$s2$ indicating a result of verifying a result of verifying the stroke s2 with the stroke data, and an evaluation value table 212-$s3$ indicating a result of verifying the stroke s3 with the stroke data.

The evaluation value generation part 222 of this embodiment verifies the stroke s1 with every target verification stroke included in the stroke data 121 and obtains an evaluation value indicating the level in which the stroke s1 matches the target verification strokes. A known technology for character recognition may be used to obtain the evaluation value (match level).

Then, the evaluation value generation part 222 obtains three codes corresponding to the target verification strokes having the highest evaluation values and stores the evaluation values corresponding to the codes in a descending order in the evaluation value table 212-$s1$.

Similarly, the evaluation value generation part 222 performs the same processes on the strokes s2 and s3 and stores the results of the processes in the evaluation value table 212-$s2$ and the evaluation value table 212-$s3$, respectively.

According to the evaluation value table 212-$s1$, the stroke s1 exhibits the highest match level with respect to the target verification stroke of code 1a. That is, the stroke s1 has a shape that is most similar to the shape of the target verification stroke of the code 1a.

Similarly, the stroke s2 exhibits the highest match level with respect to the target verification stroke of code 4b, and the stroke s3 exhibits the highest match level with respect to the target verification stroke of code 7b.

As described above, the evaluation value table 212 of this embodiment includes multiple candidates of combinations of target verification strokes that constitute a target verification character. Further, the evaluation value table 212 includes evaluation values corresponding to the multiple candidates of combinations of target verification strokes.

In the example illustrated with FIGS. 14A and 14B, the codes of the three target verification strokes having the highest evaluation values are stored in a descending order in the evaluation value table 212. However, the number of codes of the target verification strokes to be stored in the evaluation value table 212 is not limited in particular. For example, the evaluation value generation part 222 may store evaluation values as a result of verifying the input strokes with all of the target verification strokes included in the stroke data 121.

Next, the process of the pattern generation part 223 according to an embodiment of the present invention is described with reference to FIG. 15. FIG. 15 is a schematic diagram illustrating patterns of combinations of strokes that are generated by the pattern generation part 223.

The pattern generation part 223 of this embodiment generates uses the codes of the target verification strokes stored in the evaluation value table 212 to generate patterns of combinations of codes of target verification strokes that are equivalent to the number of input strokes.

In this embodiment, the number of input strokes are three. Therefore, the pattern generation part 223 refers to the stroke data 121 and generates patterns of combinations of three codes.

In the example of FIG. 15, the pattern generation part 223 generates patterns of combinations of three codes starting from "1a-1a-1a", "1a-1a-1b", "1a-1a-1c", . . . . The stroke data 121 of this embodiment includes nineteen target verification strokes. Therefore, the pattern generation part 223 generates 19×19×19 kinds of patterns.

Next, the process of the statistic data verification part 224 according to an embodiment of the present invention is described with reference to FIGS. 16A and 16B. FIG. 16A is a schematic diagram illustrating the statistic verification result table 213 in a case where three strokes are input. FIG. 16B is a schematic diagram illustrating an expression for calculating the score of each combination of strokes.

In this embodiment, a score for a pattern generated by the pattern generation part 223 is calculated by the following Expression (1) in a case where the evaluation value of the $i^{th}$ stroke is "Hi" and the appearance probability of the combination of the $(i-1)^{th}$ stroke and the $i^{th}$ stroke is assumed as "P(i)".

$$\text{Score of combination of target verification stroke} = \Sigma (Hi \times P(i)) \times \alpha \qquad \text{Expression (1)}$$

The statistic data verification part 224 of this embodiment performs calculation on all combinations generated by the pattern generation part 223 by using Expression (1). Thereby, the score of each pattern is calculated. It is to be noted that "α" is a coefficient is used when weighting a score and is a value that is set beforehand.

For example, a score "Su" of the pattern "1a-1a-1a" illustrated in FIG. 15 is obtained as follows.
Su={(appearance probability of a combination of code "- -1a" of the statistic database 150)×(evaluation value of code 1a of evaluation value table 212 s1+(appearance probability of a combination of code "1a-1a" of the statistic database 150)×((evaluation value of code 1a of evaluation value table 212 s2"+(appearance probability of a combination of code "1a-1a" of the statistic database 150)×((evaluation value of code 1a of evaluation value table 212 s3.

The statistic data verification part 224 of this embodiment performs the above-described processes on all of the patterns generated by the pattern generation part 223 and calculates the scores of all of the patterns. Then, the statistic data verification part 224 associates the patterns of the combinations of strokes with the scores of each pattern and stores the associated data (records) in the statistic verification result table 213. When storing records of the patterns of the combinations of strokes in association with the scores of each pattern in the statistic verification result table 213, the statistic data verification part 224 may store the records in a descending order from a record having the highest score. Further, the statistic data verification part 224 may store only a predetermined number of records in the statistic verification result table 213.

As illustrated in FIG. 16A, it can be understood that the pattern "1a7a7b" has the highest value in this embodiment.

Next, the calculation of the score of pattern "1a-7a-7b" illustrated in FIG. 16B is described with reference to FIG. 14B.

In the evaluation value table 212-$s1$ of FIG. 14B, an evaluation value H1 of the code "1a" of the first stroke of the pattern "1a-7a-7b" is 95. Further, in the evaluation value table 212-$s2$ of FIG. 14B, an evaluation value H2 of the code "7a" of the second stroke of the pattern "1a-7a-7b" is 85. Further, in the evaluation value table 212-$s3$ of FIG. 14B, an evaluation value H3 of the code "7b" of the third stroke of the pattern "1a-7a-7b" is 90.

The appearance probability P1 that is multiplied with the evaluation value H1 indicates the appearance probability of the combination of the 0th stroke and the first stroke. Therefore, in this embodiment, the appearance probability P1 is the appearance probability of the combination of the code "- - 1a" of the statistic database 150. The combination of the code "- - 1a" indicates that the code "1a" is the first stroke. Similarly, the combination of the code "1a--" indicates that the last stroke is the code "1a".

The appearance probability P2 that is multiplied with the evaluation value H2 indicates the appearance probability of the combination of the first stroke and the second stroke of the pattern "1a-7a-7b". Therefore, in this embodiment, the appearance probability P2 is the appearance probability of the combination of the code "1a-7a" of the statistic database 150. Similarly, the appearance probability P3 that is multiplied with the evaluation value H3 indicates the appearance probability of the combination of the second stroke and the third stroke of the pattern "1a-7a-7b". Therefore, in this embodiment, the appearance probability P3 is the appearance probability of the combination of the code "7a-7b" of the statistic database 150.

Accordingly, in this embodiment, the score Su1 of the pattern "1a-7a-7b" is expressed as:

$$Su1=(95\times \text{appearance probability } P1+85\times \text{appearance probability } P2+90\times \text{appearance probability } P3)\times \alpha.$$

By calculating scores as described above, the score the similarity between the input strokes and the target verification strokes is weighted with the frequency in which the target verification strokes appear (appearance frequency).

In the example illustrated in FIG. 16A, the score Su1 calculated from the pattern "1a-7a-7b" is 84. Further, the score Su2 calculated from the pattern "7a-1a-3a" is 79, and the score Su3 calculated from the pattern "1a-1a-7b" is 68.

Next, the process of the boundary position output part 225 according to an embodiment of the present invention is described with reference to FIG. 17.

The boundary position table 214 of this embodiment includes data items such as "pattern", "boundary (boundary position)", and "score". The value of the item "boundary" indicates the position of a boundary of a character. The value of the item "score" indicates the score corresponding to the pattern indicating the boundary position.

The boundary position output part 225 of this embodiment extracts a predetermined number of records in a descending order from the statistic verification result table 213, and outputs boundary positions of characters constituted by the patterns of combinations of target verification strokes included in the extracted records.

In this embodiment, two records having the highest scores are extracted in a descending order from the statistic verification result table 213. Therefore, the records that are extracted are the patterns "1a-7a-7b" and "7a-1a-3a" along with their corresponding scores.

In this embodiment, the code that represents the target verification stroke is indicated with a target combination character and a sign (symbol) assigned to the target verification stroke. Therefore, the code "1a" is a target verification stroke that is identified by the number "1" and the sign "a" of the stroke data 121 (see FIG. 9). That is, in this embodiment, a number included in a code indicates a character constituted by a target verification stroke identified by a code. Therefore, in a pattern of combinations of codes that indicate the target verification stroke, a part at which the number included in a code changes is considered to be the boundary of a character.

For example, in a pattern constituted by a combination of codes "1a-7a-7b", the code of the first stroke is "1a", the code of the second stroke is "7a", and the code of the third stroke is "7b". Therefore, in the pattern "1a-7a-7b" the part between the first stroke and the second stroke is considered to be the boundary of a character.

Thus, in this example, a single character is written by the input stroke s1, and another single character is written by the input stroke s2 and the input stroke s3. Accordingly, the part after the stroke s1 is the boundary of a character.

Further, for example, in a pattern constituted by a combination of codes "7a-1a-3a", the code of the first stroke is "7a", the code of the second stroke is "1a", and the code of the third stroke is "3a". Therefore, in the pattern "7a-1a-3a", the boundary of a character is between the first stroke and the second stroke".

Therefore, in this example, the part of the input stroke s1 and the part after s2 are boundaries of a character, respectively. Thus, each of the strokes s1, s2, and s3 represents a single character.

Accordingly, the boundary position output part 225 of this embodiment associates the item "boundary position" having a value "s1" (indicating stroke s1) with the item "score" having a value "84" and stores the associated data in the boundary position table 214. Further, the boundary position output part 225 associates the item "boundary position" having a value "s1s2" (indicating strokes s1 and s2) with the item "score" having a value "79" and stores the associated data in the boundary position table 214.

Next, the process of the time verification part 226 according to an embodiment of the present invention is described with reference to FIGS. 18-20B. The time verification part of this embodiment determines the value to be added to the score based on the stroke time data stored in the input stroke table and the stroke timetable 23.

FIG. 18 is a schematic diagram illustrating the stroke time table 230 according to an embodiment of the present invention. The stroke time table 230 of this embodiment is stored beforehand in the character recognition apparatus 1.

The stroke time table 230 of this embodiment includes data items such as "status", "time", and "addition value". The value of the item "status" indicates a status when input of a stroke is interrupted. For example, in a case where the value of the item "status" is "boundary of a character", the item "status" indicates a status where input of a stroke has been interrupted due to a boundary between one character and another character. Further, in a case where the value of the item "status" is "midst of character", the item "status" indicates a status where input of a stroke has been interrupted due to an interval between one stroke and another stroke during input.

The value of the item "time" indicates the time in which input of a stroke has been interrupted (time of interval of input of a stroke(s)". The value of the item "additional value" indicates the value to be added to a score.

The time verification part 226 of this embodiment refers to the stroke time data and the stroke time table 230 and determines the status of an input interruption time during the input of a stroke. For example, in this embodiment, the time verification part 226 determines that the input of a stroke has been interrupted due to a boundary between a character and another character in a case where the input interruption time is 0.5 seconds or more. Further, the time verification part 226 determines that a character is in the midst of being input in a case where the input interruption time is less than 0.5 seconds.

In this embodiment, the value of the item "time" and the value of the item "additional value" are set beforehand, respectively.

Figures 19A, 19B:
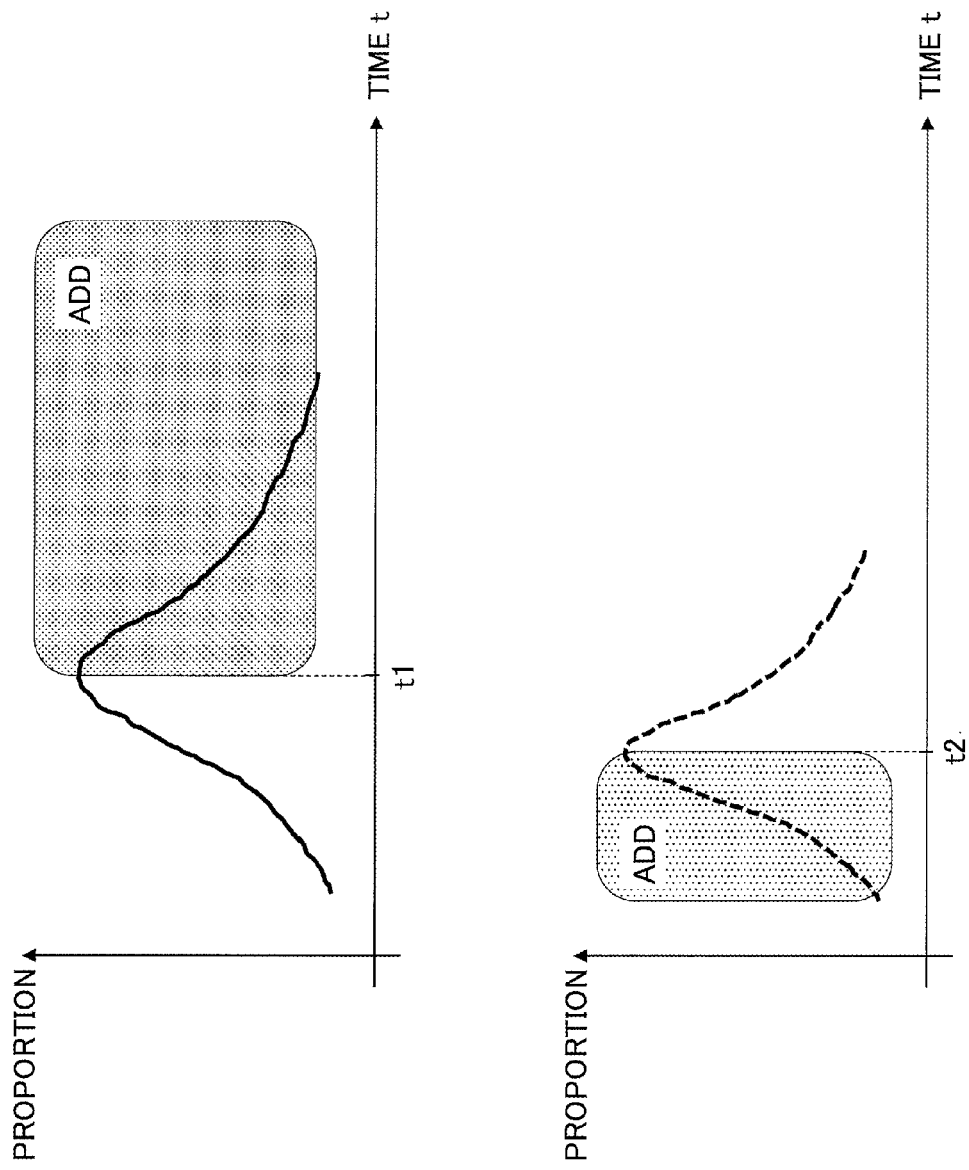
FIGS. 19A and 19B are schematic diagrams illustrating values set with a stroke time table according to an embodiment of the present invention.

Next, the value that is set to the stroke time table 230 (set value) according to an embodiment of the present invention is described with reference to FIGS. 19A and 19B. FIGS. 19A and 19B are schematic diagrams for explaining the set value of the stroke time table 230 according to an embodiment of the present invention.

FIG. 19A is a graph illustrating a relationship between a time in which input of a stroke is interrupted (interruption time) at a boundary between one character and another character, and a proportion of test subjects (test personnel). FIG. 19B is a graph illustrating a relationship between a time in which input of a stroke in interrupted in the midst of input of a character, and a proportion of test subjects (test personnel).

The graphs of FIGS. 19A and 19B are results obtained by allowing the test subjects to input a character string to a character recognition apparatus and measuring the time in which input of a stroke has been interrupted.

The interruption time of an input of a stroke becomes shorter as the character writing speed of a test subject becomes faster, and becomes longer as the character writing speed of the test subject becomes slower.

Further, in a case where the input of a stroke is interrupted due to a boundary between one character and another character, the interruption speed is considered to become longer than the time where the input of a stroke is interrupted in the midst of inputting a character. Therefore, the interruption time of an input stroke tends to indicate a boundary between one character and another character when the interruption time of an input stroke is long, and tends to indicate the midst of input of a character when the interruption time of an input character is short.

Thus, in a case where the interruption time due to a boundary between one character and another character is longer than a predetermined threshold time, an additional value is added to a score. Further, in a case where the interruption time of a character becomes shorter than a predetermined threshold time, an additional value is added to a score.

In the embodiment illustrated with the graph of FIG. 19A, the interruption time is due to a boundary between one character and another character in a case where the interruption time is equal to or greater than a time t1 in which the proportion of test subjects becomes highest relative to the interruption time. Further, in the embodiment illustrated with the graph of FIG. 19B, the interruption time is due to being in the midst of inputting a character in a case where the interruption time is less than a time t2 in which the proportion of test subject becomes highest relative to the interruption time. In the stroke time table 230 illustrated in FIG. 18, it is assumed that the time t1=time t2=0.5 seconds.

Figures 20A, 20B, 21A, 21B:
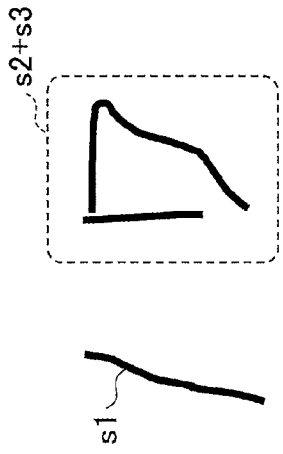
FIGS. 20A and 20B are schematic diagrams illustrating configurations of a time verification result table according to an embodiment of the present invention.
FIGS. 21A and 21B are schematic diagrams for describing a result table according to an embodiment of the present invention.

Next, the time verification result table 215 according to an embodiment of the present invention is described with reference to FIGS. 20A and 20B. FIGS. 20A and 20B are schematic diagrams for describing the time verification result table 215 according to an embodiment of the present invention. More specifically, FIG. 20A illustrates an example of stroke time data, and FIG. 20B illustrates an example of the time verification result table 215.

In the example of FIG. 20A, the input interruption time from the end point of the input of the stroke s1 and the start point of the input of the stroke s2 is 0.9 seconds. Thus, an additional value "20" is added to the score in a case where the interruption time between the end of the input of the stroke s1 and the start of the input of the stroke s2 is a boundary of a character whereas no additional value is added in a case where the interruption time between the end of the input of the stroke s1 and the start of the input of the stroke s2 is the midst of inputting a character.

Further, the input interruption time from the endpoint of the input of the stroke s2 and the start point of the input of the stroke s3 is 0.2 seconds. Thus, no additional value is added to the score in a case where the interruption time between the end of the input of the stroke s2 and the start of the input of the stroke s3 is due to a boundary of a character whereas an additional value of "20" is added to the score in a case where the interruption time between the end of the input of the stroke s2 and the start of the input of the stroke s3 is due to being in the midst of inputting a character.

The time verification part 226 of this embodiment refers to the stroke time table 230 and the stroke time data and obtains values to be added to the scores for the patterns "1a-7a-7b" and "7a-1a-3a" after being that have been subjected to the determination of a character boundary.

The position of a character boundary of the pattern "1a-7a-7b" is determined to be after the stroke s1.

Therefore, the interruption from the end of the input of the stroke s1 to the start of the input of the stroke s2 is determined to be due to a boundary between one character and another character. In the stroke time data illustrated in FIG. 20A, the interruption time between the end of the input of the stroke s1 and the start of the input of the stroke s2 is 0.9 seconds. Because the interruption time between the end of the input of the stroke s1 and the start of the input of the stroke s2 is greater than or equal to 0.5 seconds, the time verification part 226 obtains an additional value "20".

Further, the interruption from the end of the input of the stroke s2 to the start of the input of the stroke s3 in the pattern "1a-7a-7b" is determined to be due to being in the midst of inputting a character. Thus, in the stroke time data illustrated in FIG. 20A, the interruption time between the end of the input of the stroke s2 and the start of the input of the stroke s3 is 0.2 seconds. Because the interruption time between the end of the input of the stroke s2 and the start of the input of the stroke s3 is less than 0.5 seconds, the time verification part 226 obtains an additional value "20".

Accordingly, the additional value added to the pattern "1a-7a-7b" is "40" (=20+20).

The position of a character boundary of the pattern "7a-1a-3a" is determined to be after the stroke s1 and after the stroke s2.

Therefore, the interruption from the end of the input of the stroke s1 to the start of the input of the stroke s2 as well as the interruption from the end of the input of the stroke s2 to the start of the input of the stroke s3 are determined to be due to a boundary between one character and another character. In the stroke time data illustrated in FIG. 20A, the interruption time between the end of the input of the stroke s1 and the start of the input of the stroke s2 is 0.9 seconds. Because the interruption time between the end of the input of the stroke s1 and the start of the input of the stroke s2 is greater than or equal to 0.5 seconds, the time verification part 226 obtains an additional value "20".

Further, the interruption from the end of the input of the stroke s2 to the start of the input of the stroke s3 in the pattern "7a-1a-3a" is 0.2 seconds. Because the interruption time between the end of the input of the stroke s2 and the start of the input of the stroke s3 is less than 0.5 seconds, the time verification part 226 obtains no additional value.

Accordingly, the additional value added to the pattern "7a-1a-3a" is "20" (=20+0).

The time verification part 226 of this embodiment associates the additional values derived for each pattern with corresponding patterns and boundary positions and stores the associated data in the time verification result table 215.

Next, the process of the result output part 227 according to an embodiment of the present invention is described with reference to FIGS. 21A and 21B. FIGS. 21A and 21B are schematic diagrams for describing a result table 216 according to an embodiment of the present invention. FIG. 21A illustrates an example of the result table 216. FIG. 21B illustrates an example of strokes recognized by the recognition part 300.

The result output part 227 of this embodiment refers to the time verification result table 215 and the boundary position table 214 and outputs the results of adding the additional values of the time verification result table 215 to the scores of the boundary position table 214 to the result table 216.

The result table 216 illustrated in FIG. 21A includes patterns, boundary positions, and scores (being added with the additional values) that are associated with each other. In this embodiment, the score of the pattern "1a-7a-7b" after being added with a corresponding additional value is "124" (=84+40), and the score of the pattern "7a-1a-3a" after being added with a corresponding additional value is "99" (=79+20).

The result output part 227 of this embodiment outputs the position of the boundary of the character constituted by the input strokes to the recognition part 300. In this embodiment, the position of the boundary of the character is a position of a boundary of a character having the highest score after being added with a corresponding additional value.

Therefore, the result output part 227 reports to the recognition part 300 that the position after the stroke s1 (which is the boundary position of the pattern "1a-7a-7b") is the character boundary among the three input strokes.

When the position of the boundary of a character is reported to the recognition part 300, the recognition part 300 recognizes that the stroke s1 indicates a single character and that the strokes s2 and s3 constitute a single character as illustrated in FIG. 21B.

Accordingly, the recognition part 300 of this embodiment can recognize characters in a similar manner as the method of recognizing characters by strokes input to a frame.

With the above-described embodiment, multiple patterns of combinations of target verification strokes include in the stroke data 121 of the stroke dictionary database 120 can be generated in accordance with the number of input strokes. Further, evaluation values indicating the similarity between an input stroke and a target verification stroke can be obtained.

Further, a score corresponding to each generated pattern can be calculated based on the appearance probability of the target verification strokes included in a combination of input strokes and the obtained evaluation values. Further, a pattern having the highest score can be identified. Further, the position of a boundary of a character can be obtained based on the stroke data 121 and reported to the recognition part 300.

That is, with the above-described embodiment, a combination of input strokes can be identified in accordance with the appearance probability of the target verification strokes having high similarity with the input strokes, and perform character recognition based on the identified combination of input strokes. Thus, even in a case where a few strokes are input, character recognition can be performed with accuracy even for strokes having the probability of constituting multiple characters.

Further, with the above-described embodiment, the position of the boundary of a character can be derived by using the stroke time data obtained when strokes are input. Thus, the boundary of a character can be recognized with accuracy. When calculating a score in the above-described embodiment, the smaller the value of the coefficient $\alpha$ is, the more influence the stroke time data has on the value of the score.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein a character recognition program that causes a computer to execute a process comprising:
   generating input stroke data from input coordinate data corresponding to an input operation,
   generating a plurality of stroke combination candidates and evaluation data corresponding to the plurality of stroke combination candidates from the input stroke data, the plurality of stroke candidates including target verification strokes that are combined to constitute one or more target verification characters,
   identifying a first stroke combination from the plurality of stroke combination candidates based on appearance probability of the target verification strokes, appearance probability data of each stroke stored in a storage device, and the evaluation data, and outputting a character corresponding to the input operation based on the first stroke combination;

wherein the appearance probability of the target verification strokes indicates a probability in which the target verification strokes appear in each of the one or more target verification characters, and wherein the appearance probability data is generated based on the appearance probability of the target verification strokes.

2. The non-transitory computer-readable recording medium as claimed in claim 1, wherein the input stroke data includes time data pertaining to the input operation, the time data indicating a time for inputting a stroke, and wherein the time data is used between one stroke and another stroke for identifying the first stroke combination.

3. The non-transitory computer-readable recording medium as claimed in claim 1, Wherein the process further comprises identifying the first stroke combination by determining a boundary between one character and another character based on a combination of the target verification strokes.

4. The non-transitory computer-readable recording medium as claimed in claim 1, wherein the evaluation data corresponding to the plurality of stroke combination candidates includes a value indicating a level in which each target verification stroke matches the input stroke.

5. The non-transitory computer-readable recording medium as claimed in claim 1, wherein the process further comprises extracting a number from a numeric value extracted from big data, the target verification character including the extracted number, and wherein the appearance probability is generated based on stroke data indicating a type of the target verification stroke constituting the extracted number, the appearance probability of the target verification strokes, and an appearance probability of each target verification character.

6. A method for causing a computer including a storage device to perform a character recognition method, the character recognition method comprising:

generating input stroke data from input coordinate data corresponding to an input operation;

generating a plurality of stroke combination candidates and evaluation data corresponding to the plurality of stroke combination candidates from the input stroke data, the plurality of stroke candidates including target verification strokes that are combined to constitute one or more target verification characters;

identifying a first stroke combination from the plurality of stroke combination candidates based on appearance probability of the target verification strokes, appearance probability data of each stroke stored in the storage device, and the evaluation data; and outputting a character corresponding to the input operation based on the first stroke combination, wherein the appearance probability of the target verification strokes indicates a probability in which the target verification strokes appear in each of the one or more target verification characters, and wherein the appearance probability data is generated based on the appearance probability of the target verification strokes.

7. A character recognition apparatus comprising:

a storage device; and a processor that executes a character recognition process including generating input stroke data from input coordinate data corresponding to an input operation, generating a plurality of stroke combination candidates and evaluation data corresponding to the plurality of stroke combination candidates from the input stroke data, the plurality of stroke candidates including target verification strokes that are combined to constitute one or more target verification characters, identifying a first stroke combination from the plurality of stroke combination candidates based on appearance probability of the target verification strokes, appearance probability data of each stroke stored in the storage device, and the evaluation data, and outputting a character corresponding to the input operation based on the first stroke combination, wherein the appearance probability of the target verification strokes indicates a probability in which the target verification strokes appear in each of the one or more target verification characters, and wherein the appearance probability data is generated based on the appearance probability of the target verification strokes.

* * * * *